United States Patent [19]

Steiger

[11] Patent Number: 4,977,970
[45] Date of Patent: Dec. 18, 1990

[54] DIFFERENTIAL DRIVE AND STEERING SYSTEM

[76] Inventor: Maurice J. Steiger, 1404 Birchland Dr., Thief River Falls, Minn. 56701

[21] Appl. No.: 479,420

[22] Filed: Feb. 12, 1990

[51] Int. Cl.$^5$ .............................................. B62D 11/06
[52] U.S. Cl. ...................................... 180/6.2; 475/25; 475/211
[58] Field of Search ...................... 180/6.2, 6.32, 6.34, 180/6.38, 6.4; 475/18, 21, 25, 210, 211

[56] References Cited

U.S. PATENT DOCUMENTS

| | | | |
|---|---|---|---|
| 2,164,818 | 7/1939 | Heyer et al. | 475/211 |
| 2,521,658 | 9/1950 | Van Voorhis | 475/18 |
| 4,273,206 | 6/1981 | Van der Lely | 180/6.2 |

FOREIGN PATENT DOCUMENTS 0166164 10/1983 Japan .................................... 475/210

Primary Examiner—Charles A. Marmor
Assistant Examiner—Mitchell Bompey

[57] ABSTRACT

A differential drive and steering system for a vehicle includes a differential drive device including an input shaft which is drivingly connected to a pair of output shafts by a differential gear device. A torque converter is drivingly connected with the differential gear mechanism and includes a speed control shaft journaled on the differential gear mechanism housing. A pair of variable pitch pulleys are respectively mounted on the speed control and input shafts and are connected by an endless belt. A transmission shaft is drivingly connected to one of the output shafts and is connected to the speed control shaft by a planetary gear mechanism. A drive sprocket is keyed to the input shaft and a driven sprocket is secured to the planetary gear mechanism. An endless chain is trained about the sprockets whereby the vehicle may be steered by selectively varying the pitch on the pulleys.

7 Claims, 2 Drawing Sheets

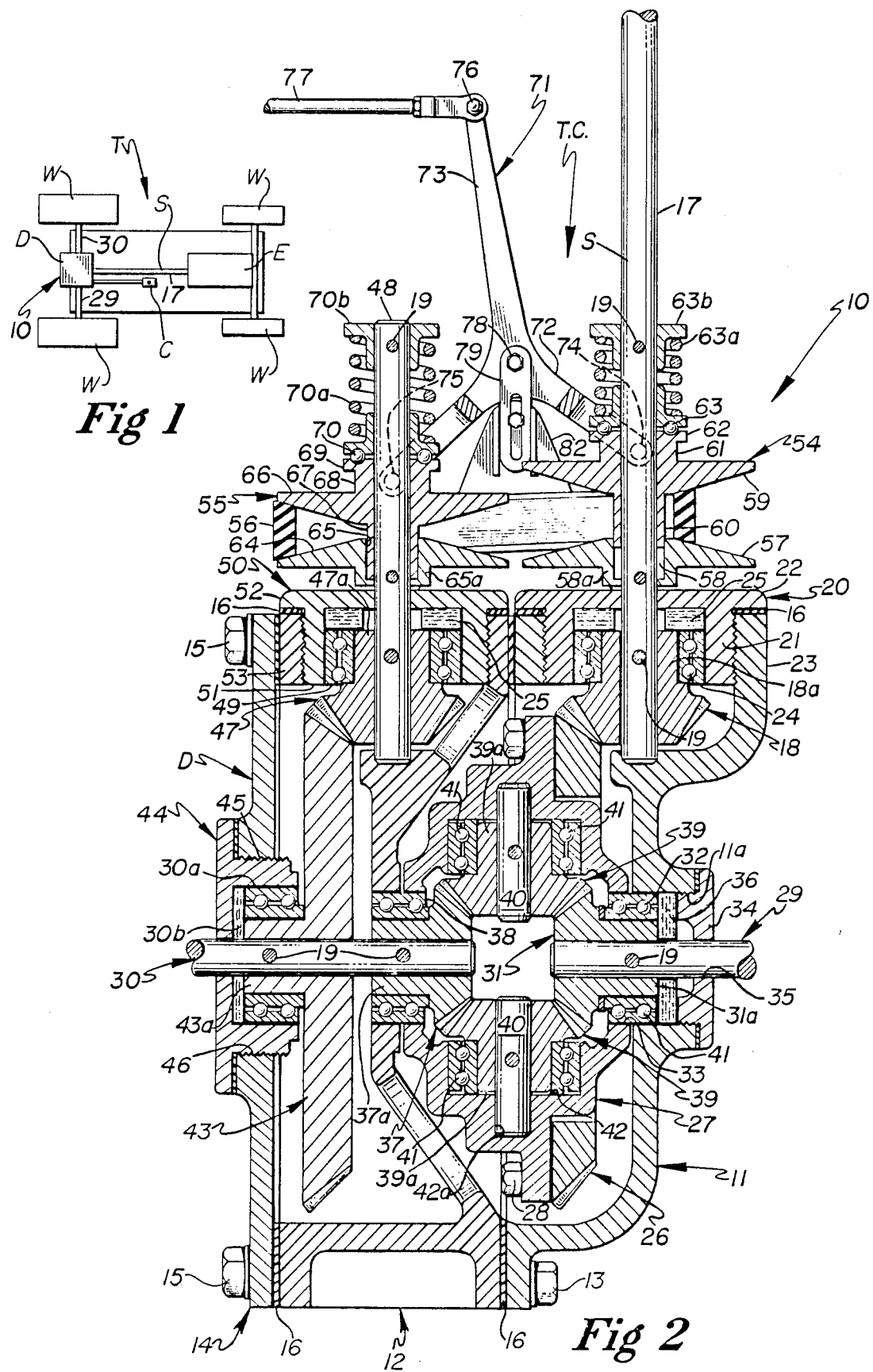

DIFFERENTIAL DRIVE AND STEERING SYSTEM

This invention relates to a differential drive and steering sytem.

BACKGROUND OF THE INVENTION

In certain vehicles, such as tractors or the like, steering is accomplished by driving. Skid steer loaders steer by driving, but typically accomplish this steering with hydrostatic power units. Other vehicles accomplish steering by differential driving. For example, the Van der Lely, U.S. Pat. No. 4,273,206, discloses a pair of torque converters for the rear wheel drive of a tractor, in which each output for the ground engaging units is transmitted through a planetary gear system. Others use a conventional clutch system for selectively driving one or the other side of the vehicle.

SUMMARY OF THE INVENTION

It is an object of this invention to provide a vehicle with a novel differential drive and steering system in which a single torque converter is used to accomplish the steering. In carrying out this invention, the torque converter is comprised of a pair of variable pitched split sheave pulleys drivably connected together, and each is capable of driving one of the output shafts through the differential. By manipulating the torque converter, the output shafts from the differential may be driven in a conventional manner, or differential steering may be readily accomplished. At any rate, the differential drive and steering system is of inexpensive construction and operation and functions efficiently during the differential drive and steering sequences.

These and other objects of the invention will be more fully defined in the following Specification.

FIGURES OF THE DRAWING

FIG. 1 is a diagrammatic view of a vehicle incorporating the novel differential drive and steering system;

FIG. 2 is a transverse horizontal cross-sectional view of the novel differential drive and steering sytem, looking downwardly from the cutting plane;

DESCRIPTION OF THE PREFERRED EMBODIMENT

Figure 3:
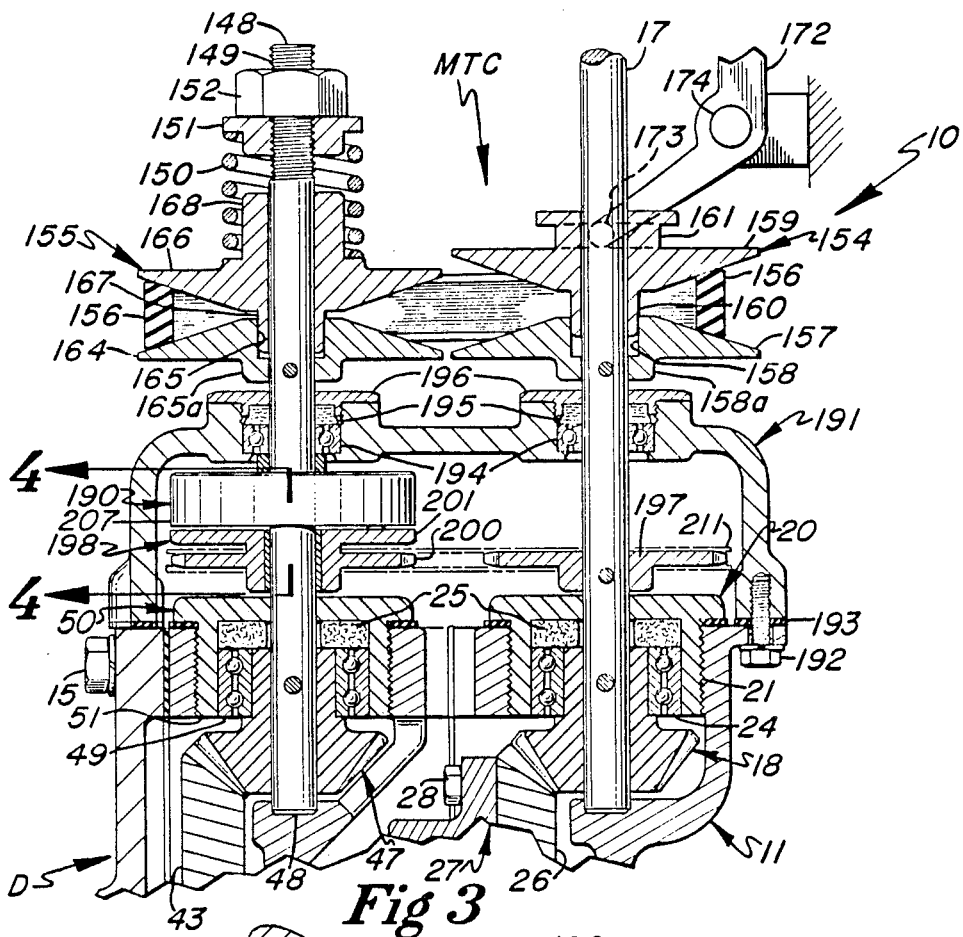
FIG. 3 is a cross-sectional view of a portion of a modified embodiment of the differential drive and steering system.

Referring now to the drawing, it will be seen that one embodiment of the novel differential drive and steering system, designated generally by the reference numeral 10, is thereshown. The differential drive and steering system 10 includes a differential drive D, including a conventional housing structure 11, which is in the form of a casting, and which has an internal casting 12 secured thereto and positioned therein by suitable bolts 13. A closure end plate 14 is secured to the internal casting 12 by means of bolts 15. Suitable seals 16 are interposed between the internal casting 12, the housing 11, and the closure end plate 14.

The differential drive and steering system includes a power input shaft 17, which is connected to a source of power, such as an internal combustion engine or the like, and the input shaft 17 has a power input pinion gear secured thereto. In the embodiment, the power input pinion gear 18 is provided with a shank 18a through which the input power shaft 17 projects and is secured thereto by a pin 19. The shank 18a of the power input pinion gear 18 is positioned within a bearing support member 20, which is comprised of an externally threaded sleeve 21 having a flange 22 integrally formed therewith. The housing 11 is provided with an internally threaded sleeve 23, which threadedly engages the externally threaded sleeve 21 to secure the bearing support member 20 thereto. A ball bearing unit 24 is positioned within the threaded sleeve 23 and engages an annular seal 25 positioned around the input shaft 17 and engaging the inner surface of the flange 22 It will also be noted that a seal is interposed between the flange 22 and the end of the internal threaded sleeve 23 of the housing 11.

The power input pinion gear 18 is disposed in meshing relation with a power bevel gear 26 positioned within the housing and secured to a differential carrier 27 by bolts 28. An output shaft 29 and an output shaft 30 project from the differential carrier 27 and from the housing 11. These output shafts are connected to ground engaging members, such as wheels, tracks, or the like, for propelling a vehicle along a ground surface. In the embodiment shown, it is preferred that the shafts 29 and 30 be connected to the rear wheels or tracks of a vehicle.

The shank 31a of a pinion gear 31 is pinned to the output shaft 29. A ball bearing unit 32 is positioned around the shank 31a of the pinion gear 31 and is positioned within an opening 33 in a differential carrier 27 and a registering opening in the housing 11. An externally threaded cap 34 threadedly engages the threads in the opening 11a in the housing 11. The threaded cap 34 has an opening 35 therein through which projects the shaft 29, and seal 36 is disposed between the cap 34 and the ball bearing unit 32.

The output shaft 30 projects through an opening in a pinion gear 37 in the shank 37a thereof and is pinned thereto to permit rotation of the pinion gear and output shaft as a unit. A ball bearing unit 38 is positioned within an opening in the differential carrier 27 and in a registered opening in the internal casting 12 to thereby journal the pinion gear and shaft therein.

A pair of idler pinion gears 39 are positioned within the carrier 27 and each has a shank 39a. Each of the pinion gears and their associated shanks have an opening therethrough for accommodating one of a pair of similar shafts 40, which are pinned thereto A pair of ball bearing units 41 are each positioned in one of a pair of opposed recesses 42 in the differential carrier 27, and each is disposed in bearing relation with respect to the shank 39a of the associated pinion gear 39. It will also be noted that the end of each shaft 40 projects into a reduced recess portion 42a that communicates with one of the recesses 42. With this arrangement, it will be seen that drive from the power input shaft 17 will be transmitted from the power pinion to the power bevel gear to revolve the differential carrier and thereafter revolve each of the output shafts 29 and 30, respectively.

A secondary bevel gear 43 having a shank 43a has an opening therethrough and the shaft 30 projects through the opening and through an opening in an end cap 44.

The secondary bevel gear 43 is pinned to the shaft 30 for rotation therewith. The end cap 44 is provided with an externally threaded sleeve portion 45 which threadedly engages a threaded opening 46 in the end plate 14. A ball bearing unit 30a is positioned within the sleeve portion 43 of the end cap to journal the secondary bevel gear 43 and shaft 30 therein. A seal 30b is disposed between the end cap 44 and the shank 43a of the secondary bevel gear 43.

A secondary input pinion gear 47 having a shank 47a is disposed in meshing relation with the secondary bevel gear 43. A power or speed control shaft 48 projects through an opening in the pinion gear 47 and shank 47a thereof and is pinned thereto by a pin so that the shaft and secondary pinion gear rotate as a unit. A ball bearing unit 49 is positioned around the shank 47a of the secondary input pinion gear 47 and is positioned within a bearing support member 50 The bearing support member 50 includes an externally threaded sleeve 51 having a flange 52 extending radially outwardly from one end thereof. The externally threaded sleeves threadedly engage an internally threaded sleeve 53 of the internal casting 12.

Means are provided for permitting drive through the differential to be changed so that steering may be accomplished. This means comprises a torque converter TC, which includes a variable pitch split sheave pulley 54 mounted on the power input shaft 17 and a variable pitch split sheave pulley 55 mounted on the speed control shaft 48. A belt 56 is trained about the pulleys 54 and 55.

The variable pitch split sheave pulley 54 includes a fixed sheave 57, which is pinned to the power input shaft 17, and which is provided with a recess 58 and a hub 58a thereof. A movable sheave 59 has an opening therethrough through which the power input shaft 17 projects and the movable sheave is provided with a shank 60, which projects into the recess 58 in the fixed sheave 57. The movable sheave 59 is also provided with a hub 61 having an outturned flange 62 integral with one end thereof and which engages a thrust bearing 63 in a well-known manner.

The variable pitch pulley 55 also includes a fixed sheave 64 having an opening therethrough through which projects the speed control shaft 48. The fixed sheave has a recess 65 in the hub 65a therein, and the hub is pinned to the shaft 48. The pulley 55 also includes a movable sheave 66 having an opening therein through which projects the speed control shaft 48, and the movable sheave is provided with a shank 67, which projects therefrom into the recess 65 in the fixed sheave 64. The movable sheave is also provided with a hub 68 having an outturned flange 69, which cooperates with a thrust bearing 70 secured to the shaft 48.

Means are provided for shifting the movable sheave of the variable pitch pulleys toward and away from the associated fixed sheave to thereby vary the pitch of each pulley. This means includes a T-shaped speed adjusting bar 71, which is provided with a pair of forked arms 72 that project from one end of an arm 73. The outer end of one of the arms 72 is pivotally connected by a pivot 74 to the movable sheave 59 of the variable pitch pulley 53.

Similarly, the outer end of the other arm 72 is also pivotally connected by a pivot 75 to the movable sheave 66 of the variable pitch pulley 55. The outer end of arm 73 is pivotally connected by a pivot 76 to one end of an elongate control link 77. The T-shaped speed adjusting bar 71 is pivotally connected at its central portion by a pivot 78 to one end of an arm 79. The arm 79 is provided with a slot 80 therein and a set screw 81 extends through the slot and secures the arm 79 to an extension 82 of the housing 11. It will be seen that, when the control link 77 is linearly shifted in either direction, the T-shaped speed adjusting bar will be caused to pivot about the pivot 78. When this occurs, one of the movable pulley sheaves will be shifted towards its associated fixed sheave to change the pitch of the pulley and thereby force the belt 56 towards the outer marginal edge of the pulley. Conversely, the movable sheave on the other variable pitch pulley will be allowed to shift outwardly away from its associated fixed sheave so that the pitch thereof is reduced and will have a smaller effective diameter.

Referring now to FIG. 1, it will be seen that the novel differential and steering system 10 is incorporated in a conventional tractor vehicle T, which has ground engaging wheels, including the rear drive wheels W, which are driven by an engine E. Drive from the engine E is through the shaft S, which is drivingly connected to the input shaft 17 of the differential drive and steering system. A control lever C will be operatively connected to the control link 77 for controlling the shifting movement of the T-shaped speed adjusting bar 71.

When the torque converter TO is used to assist in steering of the vehicle, the control lever C will be shifted to shift the control link 77 and the adjusting bar 71. However, when the torque converter is in the position illustrated in FIG. 1, the input shaft 17 and the speed control shaft 48 will be rotating at the same angular velocity so that the output shaft 29 and output shaft 30 are also revolving at the same angular velocity. In the event that the front wheels of the vehicle may be capable of being steered, the differential will function in the conventional manner to thereby permit the vehicle to make wide radius turns.

However, when the differential drive and steering system are used to perform steering, the torque converter will be manipulated to change the pitch of the pulleys to thereby effect steering. For example, if the pitch of the pulley 55 is changed so that the movable sheave 66 is shifted axially away from the fixed sheave 64 and the belt is moved towards the axis of rotation of this pulley, then the pulley 55 will be rotating at a faster angular velocity than the pulley 54.

In this respect, the movable sheave 59 of the pulley 54 will have been shifted axially towards the fixed sheave 57 to thereby move the belt portion which engages the pulley 54 in an outward direction away from the rotational axis of the pulley 54. Drive from the pulley 55 will be transmitted to the speed control shaft 48 and then to the secondary input pinion gear 47 and thereafter to the secondary bevel gear 43 and the output shaft 30. Drive from the shaft 17 will be transmitted via the differential carrier to the output shaft 29, which will be rotated at a lower angular velocity than the output shaft 30. The vehicle will then turn on a small radius by the differential steering.

It will be seen that a wide range of turning radii for the ground engaging wheels secured to the output shafts 29 and 30 can be accomplished by this differential steering.

Figure 4:
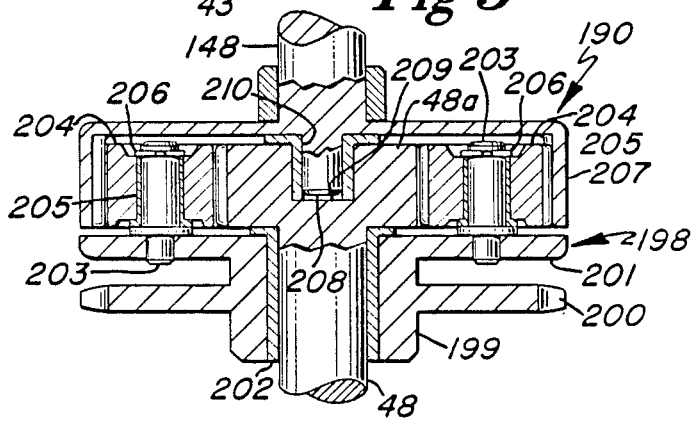
FIG. 4 is a cross-sectional view taken approximately along the line 4—4 of FIG. 3 and looking in the direction of the arrows.

Referring now to FIGS. 3 and 4, it will be seen that a different embodiment of a torque converter, designated generally by the reference character MTC, is thereshown. It is pointed out that the differential drive D is substantially the same as that illustrated in FIG. 2, and a detailed description of these identical components is unnecessary in the description of this embodiment. One difference in the differential drive is that the pinion or transmission shaft 48 to which the pinion gear 47 is secured is drivably connected to a planetary gear mechanism 190 of the modified torque converter MTC. It will be seen that the planetary gear mechanism 190 is positioned within an auxiliary housing 191, which is secured to the differential drive housing structure 11 by means of bolts 192. A suitable gasket seal 193 is interposed between the housing 11 and the auxiliary housing 191. .

The auxiliary housing 191 has a pair of openings therein through which the input shaft 17 extends. The other opening acommodates the speed control shaft 148 therethrough, which is connected to the pinion shaft 48 through the medium of the planetary gear mechanism 190. Each of the openings in the auxiliary housing has a ball bearing 194 therein and a seal 195 which is retained in place by a threaded bearing retainer 196. The ball bearings 194 journal the input shaft 17 and the speed control shaft 148 to permit rotation of the shafts.

A sprocket 197 is pinned to the input shaft 17 for rotation therewith. A sprocket and planet carrier 198 is journaled upon the pinion shaft 48 by means of a sleeve bearing 202. The sprocket and planet carrier 198 includes a hub 199 having a sprocket 200 integrally formed therewith and extending radially outwardly therefrom. A planet carrier 201 is also integrally formed with the hub 199 and extends radially outwardly therefrom, but is axially spaced from the sprocket 200.

The planet carrier 201 has a plurality of small shafts 203 integrally formed therewith and projecting axially therefrom. In the embodiment shown, four such shafts are provided, and each has a planet gear 204 journaled thereon by means of a sleeve bearing 205. Each planet gear 204 is retained on the associated shaft 203 by means of a retention ring 206. A ring gear 207 is integrally formed with one end of the speed control shaft 148 and is disposed in meshing relation with the planet gears 204. The pinion shaft 48 has a sun gear 48a integrally formed with one end thereof, and the sun gear is also disposed in meshing relation with the planet gears 204. The speed control shaft 148 has a reduced end 208 that projects into a cylindrical recess 209 in the sun gear 48a. A sleeve bearing 210 is disposed between the sun gear 48a and the reduced end 208 of the speed control shaft 148. An endless chain 211 is trained about the sprocket 197 and the sprocket 200.

The modified torque converter also includes a variable pitch split sheave pulley 154 mounted on the power input shaft 17 and a variable pitch split sheave pulley 155 mounted on the speed control shaft 148. A belt 156 is trained about the pulleys 154 and 155.

The pulleys 154 and 155 are identical to the pulleys 54 and 55 of the embodiment of FIG. 2. In this regard, the pulley 154 includes a fixed sheave 157, which is pinned to the power input shaft 17, and which is provided with a recess 158 in a hub 158a. The pulley 154 also includes a movable sheave 159 which has an opening therein through which the power input shaft 17 projects. The movable sheave 159 is provided with shank 160 which projects into the recess 158 in the fixed sheave 157. The movable sheave 159 is also provided with a hub 161.

The pulley 155 includes a fixed sheave 164 having an opening therein through which the speed control shaft 148 projects. The fixed sheave has a recess 165 in the hub 165a, and the hub is pinned to the speed control shaft 148. The pulley 155 includes a movable sheave 166 having an opening therein through which the speed control shaft 148 projects, and the movable sheave is provided with a shank 167 which projects into the recess 165 of the fixed sheave 164. The movable sheave is provided with a hub 168 which projects therefrom into and is engaged by a spring 150. The spring 150 engages a flanged nut 151 which threadedly engages the threaded end 149 of the speed control shaft 148. A lock nut 152 locks the spring 150 and nut 151 on the speed control shaft. It will be appreciated that the tension on the spring 150 can be readily adjusted by adjusting the nuts 151 and 152.

In operation, rotary power will be transmitted by the power input shaft 17 to the modified torque converter MTC and the differential drive D. If the pitch diameter of the pulleys 154 and 155 is the same, then the angular velocity of the output shafts (not shown) of the differential drive D will be the same and permit the vehicle or tractor T to travel in a straight line in a reverse or forward direction. If the operator wishes to turn the vehicle, then the movable sheave 159 of the variable pitch pulley 154 will be shifted by a shifting fork 172, which is pivotally connected to the movable sheave 159 by a pivot 173. The shifting fork 172 is also pivoted to a support by a pivot 174, and the shifting mechanism is diagrammatically illustrated in FIG. 3 by a phantom line configuration.

If the movable sheave 159 is shifted to decrease the pitch of the drive variable pitch pulley 154, the belt 156 will be tightened on the drive pulley 154 to thereby cause the pulley to be rotated faster than the driven pulley 155. Since pulley 155 is pinned to the speed control shaft 148, the speed control shaft will be rotated at the same angular velocity as the pulley 155. The sprocket 197 will also be rotated at the same speed as the input shaft 17, and this angular velocity will be transmitted to the sprocket and planet carrier 198 by the chain 211.

The drive from the speed control shaft 148 will be translated through the planetary gear mechanism 190 to the pinion shaft 48 and then to the output shaft driven by the secondary bevel gear 43 of the differential drive D. With this arrangement, it will be seen that the vehicle will make a turn about the wheel driven by the slow moving speed control shaft 148, and the turn may be a wide radius turn or even a pivot turn, depending on the selected pitch of the pulleys 154 and 155. Turning about the opposite wheel may be effected by shifting the movable sheave 159 to tighten the belt on the driven pulley 155. During this shifting movement, the sprocket and planet carrier 198 will be rotated at the same speed as the sprocket 127, but will be rotated at a different speed with respect to the speed control shaft 148 and the pinion shaft 48.

Figure 5:
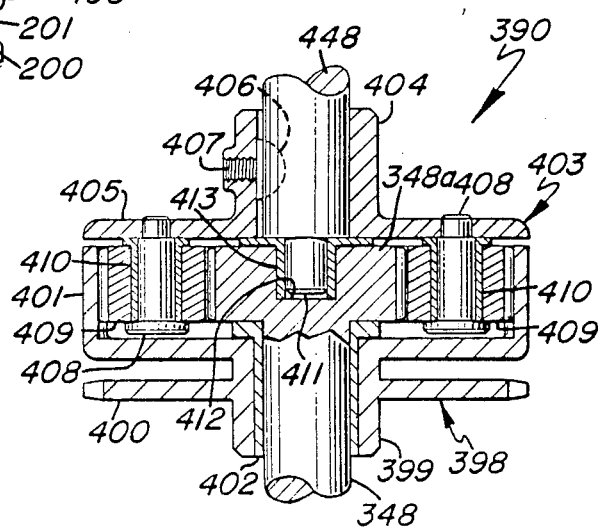
FIG. 5 is a cross-sectional view similar to FIG. 4, but illustrating a further modification of the embodiment illustrated in FIGS. 3 and 4.

Referring now to FIG. 5, it will be seen that a further modification of the planetary gear mechanism, designated generally by the reference numeral 390, is thereshown. The planetary gear mechanism 390 includes a sprocket and ring gear 398, which comprises a hub 399 having a sprocket 400 integrally formed therewith and extending radially outwardly therefrom. The hub 399 also has a ring gear 401 integrally formed therewith and extending radially outwardly therefrom, and it will be noted that the sprocket 400 and ring gear 401 are axially spaced apart with respect to each other. The sprocket and ring gear 398 are journaled on the pinion shaft 348 by means of a sleeve bearing 402.

One end of the speed control shaft 448 has a planet carrier 403 secured thereto for movement therewith. The planet carrier 403 includes a sleeve 404 positioned concentrically around the speed control shaft 448, and the sleeve has a key 406 which engages in a keyway in the speed control shaft. A set screw 407 releasably locks the sleeve 404 to the speed control shaft.

The planet carrier 403 also includes a radial plate 405 integrally formed with the sleeve 404 and extending radially outwardly therefrom. The radial plate 405 has a plurality of shafts 408 integrally formed therewith and projecting axially therefrom in the manner of the planet carrier 201. Each shaft 408 has a planet gear journaled thereon by means of sleeve bearings 410 Suitable retaining rings retain the planet gears on the shafts The planet gears are disposed in meshing relation with the ring gear 401 and with a sun gear 348a, which is integrally formed with the end of the pinion shaft 348. The speed control shaft 448 has a reduced end portion 411, which projects into a recess 412 in the sun gear 348a. A suitable sleeve bearing 413 is disposed between the reduced end of the speed control shaft 448 and the sun gear 348a.

It will be noted that the embodiment of FIG. 5 is a mere reversal of the planet carrier and ring gear illustrated in FIG. 3. Therefore, in FIG. 5, the planet carrier and associated planet gears are carried by the speed control shaft, while the sprocket and ring gear are journaled on the pinion shaft 348. The operation of the planetary gear mechanism 390 is substantially identical to that illustrated in FIGS. 3 and 4.

It will, therefore, be seen that the novel steering and differential system, which is of uncomplicated construction and operation, functions in a more efficient manner, when incorporated in a vehicle, than any heretofore known comparable systems.

What is claimed is:

1. A differential drive and steering system for a vehicle, comprising:
    a differential drive including a housing structure, an input shaft and a pair of output shafts mounted on said housing structure, differential gear means drivingly interconnecting said input shaft with said ouput shafts whereby, when the input shaft is revolved, said output shafts may be revolved with the same angular velocity with respect to each other or may be revolved differentially,
    a torque converter including a transmission shaft revolvably mounted on said housing structure,
    meshing gear means on said transmission shaft and one of said output shafts,
    a speed control shaft journaled on said housing structure,
    a planetary gear mechanism drivingly interconnecting said speed control shaft and said transmission shaft, and drive transmitting means mechanically interconnecting said input shaft with said planetary gear mechanism, and
    a pair of variable pitch pulleys, one of which is mounted on said input shaft, and the other pulley being mounted on said speed control shaft, an endless belt trained about said pulleys, control means for variously and selectively varying the pitch of said pulleys from a neutral position, wherein said power input and speed control shafts are revolved at the same angular velocity, to positions wherein one of the power input and speed control shafts is driven at a different angular velocity than the other of said power input and speed control shafts to thereby permit wide radius turns and pivot turns by selectively adjusting the pitch on said pulleys.

2. A differential drive and steering system for a vehicle, comprising:
    a differential housing structure, an input shaft revolvably mounted on said housing structure, and being connected to a source of power, a differential carrier revolvably mounted in said housing structure and having a driven gear mounted thereon, a primary input gear on said input shaft meshing with said driven gear on said differential carrier, a plurality of meshing gears in said carrier, a pair of output shafts, each being fixedly connected to one of said meshing gears in a carrier whereby, when said input shaft is revolved, said output shafts will be revolved at the same angular velocity or may be revolved differentially,
    a torque converter including a transmission shaft revolvably mounted on said housing structure and being disposed in substantially parallel relation with said input shaft,
    a secondary input pinion gear fixedly mounted on said transmission shaft and positioned within said housing,
    a secondary driven gear fixedly mounted on one of said output shafts and meshing with said secondary input gear,
    a speed control shaft journaled on said housing structure and being disposed in axial alignment with said transmission shaft,
    a pair of variable pitch pulleys, one of which is mounted on said input shaft, and the other pulley being mounted on said speed control shaft,
    a planetary gear mechanism drivably interconnecting said speed control shaft and said transmission shaft, and drive transmitting means mechanically interconnecting said input shaft with said planetary gear mechanism, and
    an endless belt trained about said pulleys, control means for variously and selectively varying the pitch on said pulleys from a neutral position wherein said power input and speed control shafts are revolved at the same angular velocity, to positions wherein one of the power input and speed control shafts is driven at a different angular velocity than the other of said power input and speed control shafts to thereby permit wide radius or pivot turns by selectively adjusting the pitch of said pulleys.

3. The differential drive and steering system as defined in claim 1 wherein said drive transmitting means comprises a drive sprocket fixed to said input shaft for rotation therewith and a driven sprocket journaled on said transmission shaft for rotation relative thereto, and an endless chain trained about said sprockets.

4. The differential drive and steering system as defined in claim 1 wherein said planetary gear mechanism includes a planetary gear carrier secured to said drive transmission means, a plurality of planet gears journaled on said planetary gear carrier, a ring gear meshing with said planet gears secured to said speed control shaft, and a sun gear secured to said transmission shaft and meshing with said planet gears.

5. The differential drive and steering system as defined in claim 1 wherein said planetary gear mechanism includes a planetary gear carrier secured to said speed control shaft, a plurality of planet gears journaled on said planetary gear carrier, a ring gear meshing with said planet gears secured to said drive transmission means, and a sun gear secured to said transmission shaft and meshing with said planet gears.

6. The differential drive system as defined in claim 4 wherein said drive transmission means includes a drive sprocket affixed to said input shaft for rotation therewith, a driven sprocket affixed to said planet carrier for rotation therewith, said driven sprocket and planetary gear carrier being journaled on said transmission shaft for rotation relative thereto, and an endless chain trained about said sprockets.

7. The differential drive and steering system as defined in claim 5 wherein said drive transmission means includes a drive sprocket affixed to said input shaft for rotation therewith, a driven sprocket affixed to said ring gear for rotation therewith, said driven sprocket and ring gear being journaled on said transmission shaft for rotation relative thereto, and an endless chain trained about said sprockets.

* * * * *